(12) United States Patent
Maeda et al.

(10) Patent No.: US 6,761,916 B2
(45) Date of Patent: Jul. 13, 2004

(54) METHOD FOR PRODUCING BREADS WITH A RECOMBINANT YEAST WHICH EXPRESSES A PHOTOPROTEIN

(75) Inventors: Tatsurou Maeda, Ohi-machi (JP); Masaharu Yamada, Ohi-machi (JP); Kouji Takeya, Ohi-machi (JP)

(73) Assignee: Nisshin Seifun Group Inc., Tokyo (JP)

( * ) Notice: Subject to any disclaimer, the term of this patent is extended or adjusted under 35 U.S.C. 154(b) by 113 days.

(21) Appl. No.: 10/255,624

(22) Filed: Sep. 27, 2002

(65) Prior Publication Data

US 2003/0185935 A1 Oct. 2, 2003

(30) Foreign Application Priority Data

Mar. 29, 2002 (JP) ........................................ 2002-094949

(51) Int. Cl.⁷ ................................................. A21D 8/04
(52) U.S. Cl. ............................. 426/20; 426/62; 426/555
(58) Field of Search ............................... 435/8, 254.21; 426/19, 20, 62, 552, 555, 656

(56) References Cited

FOREIGN PATENT DOCUMENTS

JP          2000-102387    *    4/2000    ........... C12N/15/09

OTHER PUBLICATIONS

Robert S. Sikorski et al., "A System of Shuttle Vectors and Yeast Host Strains Designed for Efficient Manipulation of DNA in *Saccharomyces cerevisiae*", *Genetics*, 122: 19–27 (May 1989).

Haruyo Sawai–Hatanaka et al., "Cloning, Sequencing, and Heterologous Expression of a Gene Coding for *Arthromyces ramosus* Peroxidase," *Biosci. Biotech. Biochem.*, 59 (7), 1221–1228, 1995.

Toshiyuki Murai et al., "Construction of a Starch–Utilizing Yeast by Cell Surface Engineering", *Applied and Environmental Microbiology*, vol. 63, No. 4, Apr. 1997, pp. 1362–1366.

* cited by examiner

*Primary Examiner*—Keith Hendricks
(74) *Attorney, Agent, or Firm*—Oblon, Spivak, McClelland, Maier & Neustadt, P.C.

(57) ABSTRACT

A method for producing breads by use of a yeast which has been transformed with a photoprotein expression recombinant vector, the vector containing a fragment of a yeast-derived agglutinin gene and a gene coding for a photoprotein. The present invention enables to produce breads having a soft flavor of fermentation and exhibiting excellent expansion, thinly and uniformly stretched internal grain, and a smooth, good-shaped external appearance.

1 Claim, No Drawings

METHOD FOR PRODUCING BREADS WITH A RECOMBINANT YEAST WHICH EXPRESSES A PHOTOPROTEIN

TECHNICAL FIELD

The present invention relates to a method for producing breads through use of yeast that has been transformed with a photoprotein expression recombinant vector.

BACKGROUND ART

At present, a variety of yeast strains are used in the bread industry, in consideration of consistent activity of yeast during continuous bread making steps, as well as staling resistance and uniform quality of the resultant breads. Recently, a number of methods have been proposed in an attempt to produce breads having a soft flavor of fermentation and being endowed with excellent internal grain and external appearance.

However, no method has ever attained these targets successfully.

In view of the foregoing, the present inventors have performed careful studies so as to establish a method for producing breads having a soft flavor of fermentation and exhibiting excellent internal structure and external appearance, thereby leading to completion of the present invention.

DISCLOSURE OF THE INVENTION

Accordingly, the present invention provides a method for producing breads by use of a yeast which has been transformed with a photoprotein expression recombinant vector, the vector containing a fragment of a yeast-derived agglutinin gene and a gene coding for a photoprotein.

BEST MODE FOR CARRYING OUT THE INVENTION

The present invention will next be described in detail.

Examples of the predominant bread-making material for producing the breads of the present invention include strong flour, semi-strong flour, medium flour, weak flour, durum wheat flour, durum semolina, rye flour, oat flour, barley flour, and mixtures thereof.

The present invention employs a specific type of yeast; i.e., a yeast which has been transformed with a photoprotein expression recombinant vector containing a fragment of a yeast-derived agglutinin gene and a gene coding for a photoprotein (the yeast is hereafter referred to as the EGFP yeast).

The above-mentioned fragment of an agglutinin gene may be a DNA fragment containing a nucleotide sequence coding for 320 amino acid residues starting from the C-terminal of α-agglutinin derived from a microorganism which belongs to genus *Saccharomyces* and a 3'-nontranslational region composed of 446 bases. This DNA fragment also contains a signal region for GPI anchoring. This DNA fragment may be obtained by cleaving, with a restriction endonuclease, a plasmid pGA11 carrying the mentioned DNA fragment, the plasmid being disclosed by Murai, T. et al., in Applied and Environmental Microbiology, 63, 1362–1366 (1997).

No particular limitation is imposed on the photoprotein, so long as it issues luminescence or fluorescence. Examples of the photoprotein include luciferase, aequorin, and green fluorescent protein (GFP). In particular, green fluorescent protein derived from Aequorea Victoria is preferred.

The photoprotein expression vector can be obtained through inserting the aforementioned gene into an expression vector which is usually used in processes making use of yeast. Examples of preferred expression vectors include, but are not limited to, pYE22M (Sawani-Hatanaka, H., et al., Biosci. Biotechnol. Biochem., 59, 1221–1228 (1995)) and pRS404 (Robert, S., S. and Philip Hieter, Genetics, 122, 19–27 (1989)).

The above-described photoprotein expression recombinant vector preferably contains a secretion signal region, a structural gene of the photoprotein (e.g., green fluorescent protein), and a fragmentary region of the yeast-derived agglutinin gene (e.g., a DNA fragment containing a nucleotide sequence coding for 320 amino acid residues starting from the C-terminal of α-agglutinin and a 3'-nontranslational region composed of 446 bases), in this order of arrangement.

An example EGFP yeast is Saccharomyces cerevisiae MT8-1 (pICS:GFP). Detailed description of EGFP yeast strains and a method for their creation is described in, among other references, Japanese Patent Application Laid-Open (kokai) No. 2000-102387.

The EGFP yeast strains may be used singly or in combination with any other yeast strain.

The amount of the EGFP yeast falls within a range of 0.01 to 10% by weight on the basis of the amount of farina, preferably 0.5 to 8% by weight, more preferably 2 to 5% by weight.

Other auxiliary raw materials include yeast food, sugars, common salt, oils or fats, egg, and dairy products, which are appropriately selected according to needs.

Examples of sugars include uncured sugar, cured sugar, liquid sugar, fructose, invert sugar, and starch sugar.

Examples of oils or fats include butter, margarine, shortening, and lard.

Examples of egg include frozen eggs, stirred egg, dried egg, and concentrated egg.

Examples of dairy products include fresh milk, powdery milk, condensed milk, cheese, and fresh cream.

In the present invention, any conventional bread-making process may be employed conveniently. For example, the following processes are employable: a rapid fermentation method, a straight dough method, a sponge dough method, a pre-ferment method, a sour dough method, a saketane leaven method, a hop leaven method, a Chumen process, a Chorleywood process, a continuous bread making process, and a retarded dough method.

The frozen dough method may be further classified into a plate-dough freezing method, in which a dough is frozen immediately after kneading; a round-dough freezing method, in which a divided and rounded dough is frozen; a molding-freezing method, in which a dough is frozen after it has undergone molding; and a proven-dough freezing method, in which a dough that has undergone final proofing is frozen. Any of these methods may be employed in the present invention.

The breads obtained by the method of the present invention include pullman-type bread, pastries, Danish pastries, French breads, rye breads, croissants, butter rolls, sweet rolls, brioches, yeast doughnuts, pizza pies, and manju (ingredient-containing buns).

EXAMPLES

The present invention will next be described in more detail by way of examples, which should not be construed as limiting the invention thereto.

EXAMPLE 1 AND COMPARATIVE EXAMPLE 1

The following ingredients were added to 100 parts by weight of wheat flour (CAMELLIA, product of Nisshin Flour Milling Inc.): Saccharomyces cerevisiae MT8-1 (pICS: GFP) (2 parts by weight), common salt (2 parts by weight), sugar (6 parts by weight), skim milk (2 parts by weight), and water (70 parts by weight). The resultant mixture was kneaded for 2 minutes at low speed, then for 5 minutes at intermediate speed. Shortening (5 parts by weight) was added thereto, and the resultant mixture was kneaded for 2 minutes at low speed, then for 6 to 7 minutes at intermediate speed to thereby yield a dough (dough temperature: 24° C.).

The resultant dough was kept at 27° C. and a humidity of 75% for 100 minutes. Subsequently, the dough was subjected to punching, and then left to rise for a further 30 minutes.

Thereafter, the resultant dough was divided into portions of 210 g, and a bench time of 25 minutes was effected at room temperature, followed by feeding to a molder. The resultant dough was folded in two, and four pieces of the folded dough were placed in a pullman-type bread case for shaping. Subsequently, the dough was subjected to proofing at 38° C. and a humidity of 85% for 38 minutes, followed by baking for 38 minutes in a 210° C. oven, to thereby yield a pullman-type bread.

In Comparative Example 1, the procedure of Example 1 was repeated except that Saccharomyces cerevisiae MT8-1 (pICS: GFP) was replaced with a commercially available yeast ("Oriental Yeast," product of Oriental Yeast Co., Ltd.).

Each of the thus-obtained pullman-type breads was evaluated by 10 panelists, on the basis of the evaluation standards shown in Table 1. The volume of each pullman-type bread was measured through the rapeseed substitution method. The results of the evaluation are shown in Table 2.

TABLE 1

| Evaluation item | Rating | Remarks |
|---|---|---|
| Flavor | 5 | Light, soft, and good flavor of fermentation with very strong sweetness |
| | 4 | Soft flavor of fermentation with strong sweetness |
| | 3 | Soft but slight acidic odor |
| | 2 | Acidic odor with a tint of strange, disagreeable smell |
| | 1 | Strong acidic odor with a strange, disagreeable smell |
| External appearance | 5 | Excellently expanded with spring; smooth and good shape |
| | 4 | Excellently expanded; good shape |
| | 3 | Moderately expanded but dull and poor spring |
| | 2 | Slightly poor in expansion; coarse and slightly rough crust |
| | 1 | Poor in both expansion and smoothness; pinhole-like holes |
| Internal structure | 5 | Thin inter-grain walls; good spring; uniform and excellently stretched |
| | 4 | Thin inter-grain walls; excellently stretched |
| | 3 | Excellently stretched but slightly dull; slightly non-uniform |
| | 2 | Somewhat thick inter-grain walls; dull |
| | 1 | Thick inter-grain walls; dull |

TABLE 2

| Evaluation item | Ex. 1 | Comp. Ex. 1 |
|---|---|---|
| Flavor | 4.6 | 1.3 |
| External appearance | 4.5 | 2.5 |
| Internal structure | 4.4 | 2.8 |
| Volume (ml) | 2,050 | 1,820 |

EXAMPLE 2 AND COMPARATIVE EXAMPLE 2

The following ingredients were added to 70 parts by weight of wheat flour (CAMELLIA, product of Nisshin Flour Milling Inc.): Saccharomyces cerevisiae MT8-1 (pICS: GFP) (2 parts by weight), and water (40 parts by weight). The resultant mixture was kneaded for 2 minutes at low speed, then for 2 minutes at intermediate speed, to thereby yield a dough (dough temperature: 24° C.).

The resultant dough was left to rise at 27° C. and a humidity of 75% for 4 hours, to thereby yield a sponge.

The following ingredients were added to the sponge: wheat flower (the same as that described above) (30 parts by weight), common salt (2 parts by weight), sugar (6 parts by weight), skim milk (2 parts by weight), and water (28 parts by weight). The resultant mixture was kneaded for 2 minutes at low speed, then for 5 minutes at intermediate speed. Subsequently, shortening (6 parts by weight) was added thereto, and the resultant mixture was kneaded for 4 minutes at intermediate speed, to thereby yield a dough (dough temperature: 27.0° C.).

After expiry of a floor time of 20 minutes at room temperature, the dough was divided into portions of 210 g. A bench time of 20 minutes was effected at room temperature, and each portion of the dough was shaped by use of a molder. The resultant dough was folded in two, and four pieces of the folded dough were placed in an English bread case for shaping. Subsequently, the dough was subjected to proofing at 38° C. and a humidity of 85% for 43 minutes, followed by baking for 35 minutes in a 210° C. oven, to thereby yield an English bread.

In Comparative Example 2, the procedure of EXAMPLE 2 was repeated except that Saccharomyces cerevisiae MT8-1 (pICS: GFP) was replaced with a commercially available yeast ("Oriental Yeast," product of Oriental Yeast Co., Ltd.).

Each of the thus-obtained English breads was evaluated on the basis of the evaluation standards shown in Table 1 in a manner similar to that described in Example 1. The results of the evaluation are shown in Table 3.

TABLE 3

| Evaluation item | Ex. 2 | Comp. Ex. 2 |
|---|---|---|
| Flavor | 4.8 | 1.8 |
| External appearance | 4.6 | 2.8 |
| Internal grain | 4.3 | 2.6 |
| Volume (ml) | 1,890 | 1,680 |

EXAMPLE 3 AND COMPARATIVE EXAMPLE 3

The following ingredients were added to 100 parts by weight of wheat flour (CAMELLIA, product of Nisshin Flour Milling Inc.): Saccharomyces cerevisiae MT8-1 (pICS: GFP) (6 parts by weight), yeast food ("MX," product of Oriental Yeast Co., Ltd.) (0.1 parts by weight), common salt (1.5 parts by weight), sugar (12 parts by weight), skim milk (2 parts by weight), whole egg (15 parts by weight), and water (48 parts by weight). The resultant mixture was kneaded for 3 minutes at low speed, then for 5 minutes at intermediate speed. Shortening (15 parts by weight) was added thereto, and the resultant mixture was kneaded for 2 minutes at low speed, then for 6 minutes at intermediate speed, to thereby yield a dough (dough temperature: 26° C.).

The dough was left to rise at 27° C. and a humidity of 75% for 20 minutes. The resultant dough was divided into portions of 40 g. A bench time of 20 minutes was effected at room temperature, and each portion of the dough was molded to have the shape of butter roll by use of a molder, followed by freezing over 30 minutes in a shock freezer (−40° C.). The resultant frozen dough was stored in a freezer at −20° C. for 20 days.

The frozen dough was allowed to thaw at 27° C. and a humidity of 75% for 60 minutes, followed by rising at 35° C. and a humidity of 80% for 60 minutes. Subsequently, the dough was baked in a 210° C. oven for 10 minutes, to thereby yield a butter roll.

In Comparative Example 3, the procedure of Example 3 was repeated except that Saccharomyces cerevisiae MT8-1 (pICS: GFP) was replaced with a commercially available yeast ("Oriental Yeast," product of Oriental Yeast Co., Ltd.).

Each of the thus-obtained butter rolls was evaluated on the basis of the evaluation standards shown in Table 1 in a manner similar to that described in Example 1. The results of the evaluation are shown in Table 4.

TABLE 4

| Evaluation item | Ex. 3 | Comp. Ex. 3 |
|---|---|---|
| Flavor | 4.4 | 1.4 |
| External appearance | 4.2 | 2.3 |
| Internal structure | 4.3 | 2.1 |
| Volume (ml) | 205 | 155 |

EXAMPLE 4 AND COMPARATIVE EXAMPLE 4

The following ingredients were added to 100 parts by weight of wheat flour (CAMELLIA, product of Nisshin Flour Milling Inc.): Saccharomyces cerevisiae MT8-1 (pICS: GFP) (4 parts by weight), yeast food ("MX," product of Oriental Yeast Co., Ltd.) (0.1 parts by weight), common salt (2 parts by weight), and water (64 parts by weight). The resultant mixture was kneaded for 4 minutes at low speed, then for 9 minutes at high speed, to thereby yield a dough (dough temperature: 24° C.).

The resultant dough was left to rise at 27° C. and a humidity of 75% for 20 minutes, then divided into portions of 60 g. A bench time of 25 minutes was effected at 27° C. and a humidity of 75%. Subsequently, each portion was molded into the shape of French bread.

Each portion of the dough was frozen over 30 minutes in a shock freezer (−40° C.), and the frozen dough was stored in a freezer at −20° C. for 30 days.

The dough was allowed to thaw at 27° C. and a humidity of 75% for 60 minutes. The resultant dough was subjected to proofing at 35° C. and a humidity of 80% for 60 minutes, and then several cuttings were given. Subsequently, the dough was baked in a 210° C oven for 30 minutes under a stream of steam, to thereby yield a French bread.

In Comparative Example 4, the procedure of Example 4 was repeated except that Saccharomyces cerevisiae MT8-1 (pICS: GFP) was replaced with a commercially available yeast ("Oriental Yeast," product of Oriental Yeast Co., Ltd.).

Each of the thus-obtained French breads was evaluated by 10 panelists on the basis of the evaluation standards shown in Table 5. The results of the evaluation are shown in Table 5

TABLE 5

| Evaluation item | Rating | Remarks |
|---|---|---|
| Flavor | 5 | Good flavor of fermentation with very strong sweetness |
| | 4 | Flavor of fermentation with strong sweetness |
| | 3 | A tint of acidic odor |
| | 2 | Acidic odor with a tint of strange, disagreeable smell |
| | 1 | Strong acidic odor with a strange, disagreeable smell |
| External appearance | 5 | Excellently expanded with spring; good shape |
| | 4 | Excellently expanded; good shape |
| | 3 | Moderately expanded but poor spring |
| | 2 | Slightly poor in expansion; and slightly rough crust |
| | 1 | Poor in both expansion and smoothness; |
| Internal structure | 5 | Good spring; excellently stretched |
| | 4 | Excellently stretched |
| | 3 | Excellently stretched but slightly dull |
| | 2 | Somewhat thick inter-grain walls; dull |
| | 1 | Thick inter-grain walls; dull |

TABLE 6

| Evaluation item | Ex. 4 | Comp. Ex. 4 |
|---|---|---|
| Flavor | 4.4 | 1.1 |
| External appearance | 4.1 | 1.5 |
| Internal structure | 4.0 | 2.3 |
| Volume (ml) | 920 | 715 |

INDUSTRIAL APPLICABILITY

The present invention enables production of breads having a soft flavor of fermentation and exhibiting excellent expansion, thinly and uniformly stretched internal grain, and a smooth, good-shaped external appearance.

When a bread dough is prepared through use of the transformed yeast of the present invention, and the dough is observed under a fluorescent microscope after it is subjected to rapid freezing, then placed on a cooling stage, and sliced, dried and fixed for observation, the dispersion state of yeast present in the bread dough and the microstructure of the dough can be visualized.

What is claimed is:
1. A method for producing breads, comprising adding to bread ingredients a yeast which has been transformed with a photoprotein expression recombinant vector, the vector containing a fragment a yeast-derived agglutinin gene and a gene coding for a photoprotein.

* * * * *

UNITED STATES PATENT AND TRADEMARK OFFICE
CERTIFICATE OF CORRECTION

PATENT NO. : 6,761,916 B2
DATED : July 13, 2004
INVENTOR(S) : Tatsurou Maeda et al.

It is certified that error appears in the above-identified patent and that said Letters Patent is hereby corrected as shown below:

Column 6,
Line 61, "a fragment a" should read -- a fragment of --.

Signed and Sealed this

Fourteenth Day of December, 2004

JON W. DUDAS
*Director of the United States Patent and Trademark Office*